INVENTORS
ROY W. BARTHEL
HOWARD R. JAQUITH

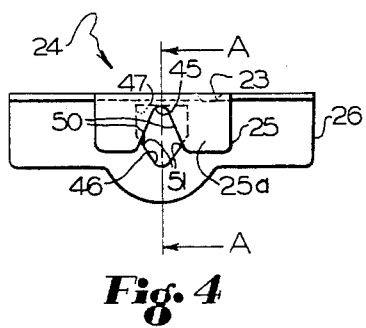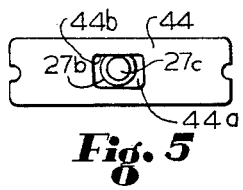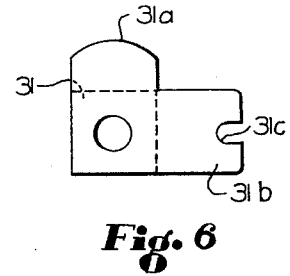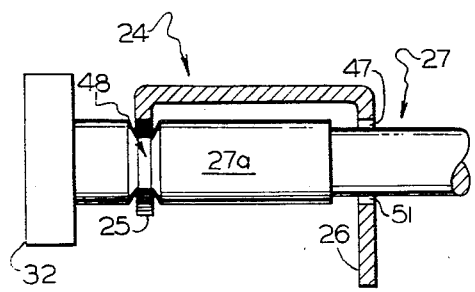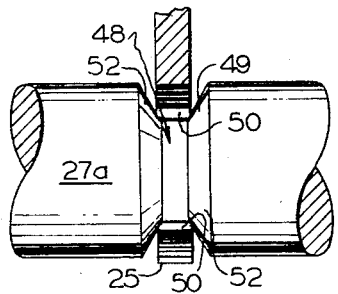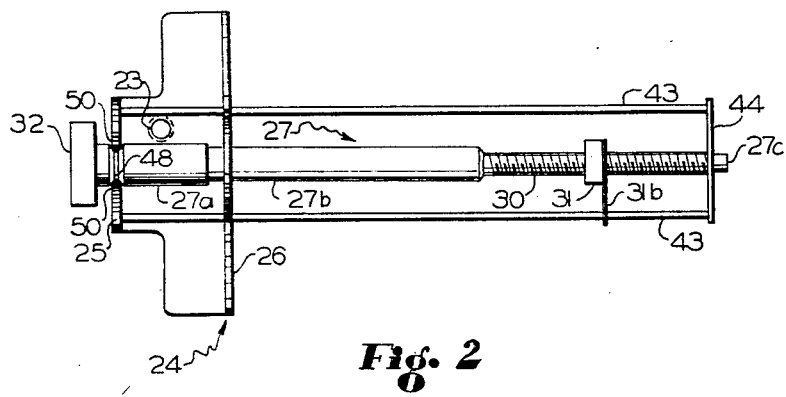
INVENTORS
ROY W. BARTHEL
HOWARD R. JAQUITH

United States Patent Office 3,396,374
Patented Aug. 6, 1968

3,396,374
FORCE BALANCE INSTRUMENT HAVING V-NOTCH MOUNTED SHAFT AND OVERRANGE PROTECTION
Roy W. Barthel, Penfield, and Howard R. Jaquith, Rochester, N.Y., assignors to Taylor Instrument Companies, Rochester, N.Y., a corporation of New York
Filed Dec. 14, 1964, Ser. No. 418,352
13 Claims. (Cl. 340—187)

ABSTRACT OF THE DISCLOSURE

A rotatable shaft is mounted by a pair of V-notched members on opposite sides of the shaft, the members being received in V-grooves circumscribing the shaft. The members are parts of an integral element hinged to a fixed support. Mechanism exerting rebalancing force biases the shaft to seat in the V-notches. A conical hole in the element receives a ball therein. A flexible rod is connected to said ball and transmits motion from a differential pressure device tending to unseat said ball from said hole and said shaft from said notches; but unseating is normally prevented by the rebalancing force. If the shaft moves, motion detecting means causes the rebalancing force to change so as to cancel shaft motion. Excessive motion of said rod, however, does cause unseating, but when the excess of motion disappears, the parts reseat in substantially the same relation they had before.

---

Figure 1:
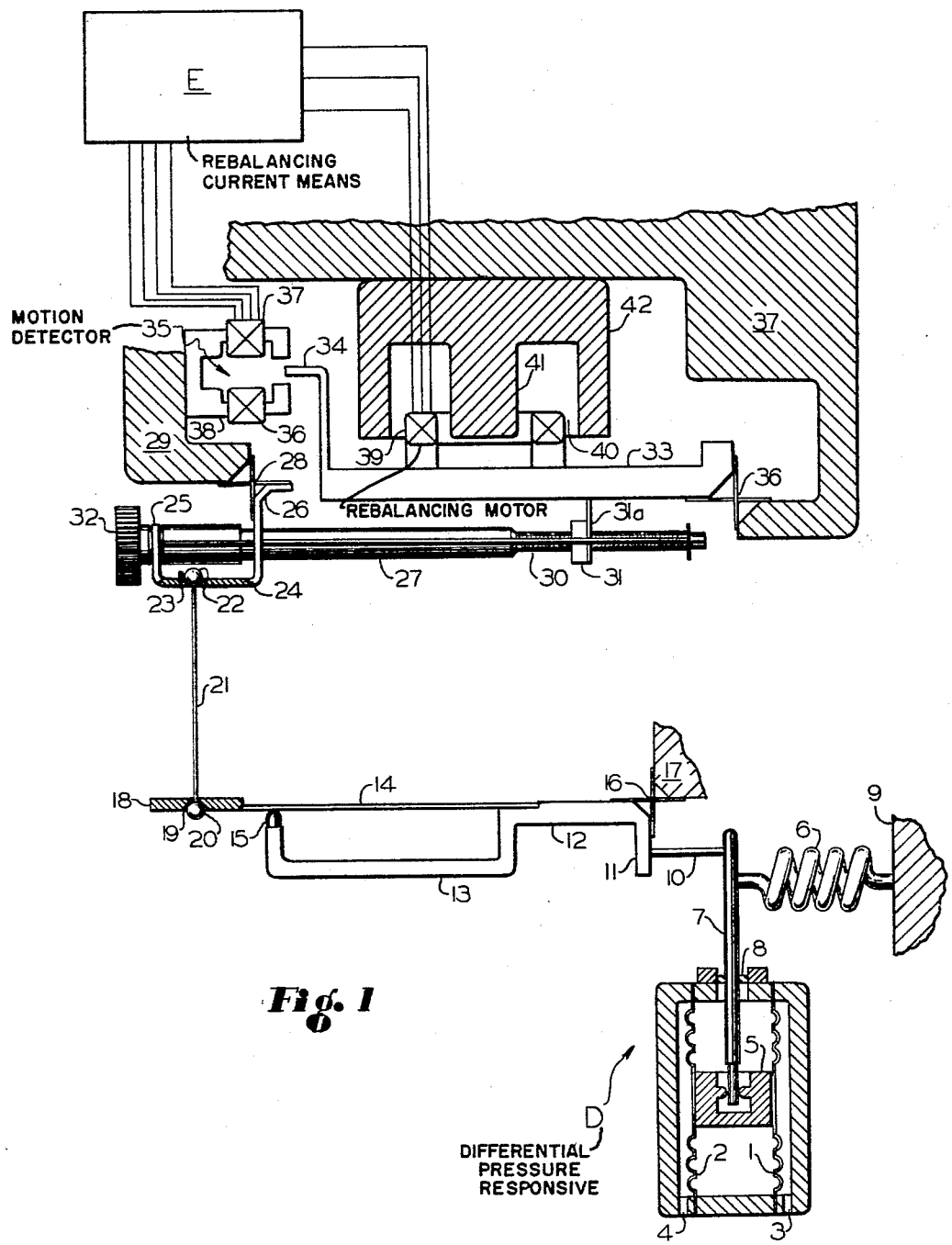

This invention relates to mechanism the parts of which are adapted to transmit relatively small motions precisely and repeatably, and are also subject to force exerted elastically, which force is relied on to normally maintain the said parts in the desired motion transmitting relation, even though parts of the mechanism are designed to be moved, at times, in manners other than that in which said relatively small motion are transmitted.

The general object of the invention is to provide novel mechanism of the character described next supra.

A particular object of the invention is to provide novel mechanism having a rotatable shaft wherein the position of the shaft is maintained precisely without complicated bearing structure. Another particular object of the invention is to provide novel mechanism wherein the normal configuration thereof, though subject to misalignment, overrange, etc., is more or less automatically restored, and wherein overrange does not damage the mechanism.

As the present invention has particular utility in application to measuring and as controlling instruments of the force-balance type, other objects of the invention are to provide such instruments with mechanism having the properties above-said. These and other objects of the invention will become evident upon perusal of the following description, and of the claims annexed hereto.

In the drawings:
FIGURE 1 illustrates a force balance instrument for measuring and/or controlling, and having mechanism therein according to the invention; FIGURE 2 is a plan view in detail of mechanism used in FIGURE 1; FIGURE 3 is an enlarged partial section on the line A—A of FIGURE 4; FIGURE 4 is an end view of a portion of the mechanism shown in FIGURE 2; FIGURES 5 and 6 show details of FIGURE 2; and FIGURE 7 shows an enlargement of a portion of FIGURE 2.

FIGURE 1 is a schematic view of the invention as applied in a force-balance instrument. Thus, there is provided a pressure responsive device D, comprising diaphragms 1 and 2, exposed to fluid pressure admitted thereto via ports 3 and 4, the pressure at port 3 being ordinarily the higher, and the diaphragms being rigidly linked by a spool 5 so that the diaphragms suffer a net deflection to the left in proportion to the difference between said pressures against the force of a spring 6. A first-class lever 7, fulcrumed at 8 in device D, is connected to one end of spring 6, and the other end of spring 6 is secured to a fixed object 9, which may be a stationary rigid part of device D, or of some casing, support, or the like, to or in which device D is fixed in place.

Most of the force due to pressure is absorbed by the diaphragms 1 and 2, the fulcrum 8 and spring 6, hence, lever 7 executes relatively small clockwise deflections to angular positions about the axis of fulcrum 8 (which axis may be taken as normal to the plane of the drawing) said angular positions being representative of the magnitude of the difference between the pressures admitted to device D via ports 3 and 4.

The deflections of lever 7 are applied via a link 10, preferably adjustable in length but otherwise inextensible, which interconnects a crank arm 11 and the upper end of lever 7. Crank arm 11 is a part of a lever 12, having a part 13 and a part 14, the latter being essentially a flat spring strip arranged to normally engage, by its inherent spring force, a stop 15 projecting up from the end of portion 13. Lever 12 is mounted by a fulcrum 16 on a fixed object 17, which may be part of object 9, and in any event is stationary with respect thereto.

One end of part 14 is secured to the right-hand portion of lever 12, and the other end thereof terminates in a pad 18 having a conical socket 19 therein receiving a ball 20 terminating one end of an inextensible elastic link 21 made of stiff steel wire or the equivalent. Link 21 terminates at its upper end in a ball 22 received in a conical socket 23 formed in a lever 24. Each such socket defines a hole through lever 24 and pad 18 to accommodate the intermediate rod-like element of the link 21. Lever 24 has tabs 25 and 26 projecting from the general plane of lever 24, and providing bearing means for a rotatable shaft 27.

Lever 24 is mounted by a fulcrum 28 on a fixed object 29, of the character of objects 9 and 17. Shaft 27 has a portion thereof threaded as at 30, and a movable fulcrum 31, essentially in the form of a nut, threads on said threaded portion 30, there being a knob 32 at the other end of shaft 27 providing for rotating shaft 27 in place while nut 30 is restrained from rotating, so that fulcrum 31 travels along threaded portion 30.

Fulcrum nut 31 and shaft 27 provide the interconnection between lever 24 and a lever 33, lever 33 having one element 34 of a motion detector 35 at end thereof, and being mounted at its other end by a fulcrum 36 to a fixed object 37, of the character of the other fixed objects referred to thus far. Motion detector 35 includes stationary elements 36, 37 and 38, fixed in position with respect to each other and as shown, are supported by object 29.

Secured to beam 33 is a "voice coil" 39 fitting closely, but without contact, in an annular air gap 40 formed by a magnet structure composed of members 41 and 42, the former being cylindrical and the latter being generally cylindrical and hollow. Member 41 is integrally fixed at its upper end to member 42 and is coaxially arranged therein, and both members are fixed, as a whole, to object 37, or equivalent.

Detector 35 provides, by virtue of means not shown, a DC current for coil 39, thereby causing the coil 39 to experience a force moving or tending to move it vertically. Coil 39 and members 41 and 42 thus provide means for elastically exerting force on lever 33.

Typically, fulcra 16, 28 and 36 will be so-called crossed-strip fulcrums, elastically resisting deflection of the associated levers, yet essentially fixing said levers in place except for their deflections which are normally restricted to definite, fixed axis.

It is therefore evident that movement of the movable members of the mechanism just described depends on the balance of the several forces, namely, that due to the differential pressure and that due to the action between voice coil 39 and the members 41 and 42. Moreover, it is evident that the extent of changes in the configuration of the mechanism depend on the stiffnesses of various spring-like entities such as fulcra 8, 16, 28 and 36, spring 6 and diaphragms 1 and 2.

In addition, changes in input of force due to fluid pressure are made to create counter changes in the force exerted by coil 39, i.e., negative feedback of force is provided, the arrangement being that for a given position of lever 7 and for a given force exerted on crank arm 11, detector element 34 is so positioned that members 36 and 37 of detector 35 cause a DC current to flow in coil 39 just sufficient to create a force on lever 33 such that the force exerted by lever 7 is unable to change the position of detector element 34.

The operation of the system, as thus far described, is in general quite conventional, and has the usual virtues of force-balance systems to the extent that an ideal force-balance is obtained, namely, to the extent that changes of input force are neutralized so exactly that the net change in configuration of the various levers is zero.

In practice, there is a net change in configuration, for the reason that the proper level of DC current in coil 39 is a function of the position of detector element 34. In the absence of friction, hysteresis, play, and/or other factors such as might cause the mechanism to have more than one configuration for the same input force, the theoretical virtues of force-balance can be realized quite satisfactorily.

However, it is necessary to provide for changes in configuration of the mechanism such as are outside the usual range of operation for which the mechanism is intended. Thus, the ball and socket linkage between levers 12 and 24 provides for overranging the lever 12, say, in consequence of a reversal of the sense of the difference between the pressures applied to device D. Normally, between feedback force and input force, balls 20 and 22 are maintained seated in sockets 19 and 23. An overly-large clockwise deflection of lever 12 merely results in pad 18 approaching lever 24 sufficiently closely that the distance between sockets 19 and 23 is less than that required in order to seat both balls simultaneously.

Upon overly large clockwise deflections of lever 7, spring part 14 of lever 12 bends. As counterclockwise deflections of lever 7 are transmitted via rigid part 13 to a point much nearer pad 18 than the place of fixation of spring part 14 to lever 12, spring part can be sufficiently elastic that bending thereof by clockwise overranging of lever 7 requires much less force than would be required to bend it by counterclockwise deflection of lever 7, i.e., the effective lever arm of pad 18 is effectively rigid for counterclockwise deflection of lever 7.

The purpose for these properties of lever 12 and the coupling provided by link 21 is to prevent damage to the mechanism and/or derangement of the properties of the mechanism.

Once the overrange is past, depending on the sense of the overrange, the balls reseat, or spring part 14 reseats on stop 15, and in the latter case, with a slightly rounded contact area on the stop 15, reseating inherently occurs always at the same point on the bottom of spring part 14. However, it is necessary to assure that the angles of conical seats 19 and 23, the coefficient of friction between balls 20 and 22 and said seats, the stiffness of rod 21, and non-vertical forces exerted by levers 12 and 22, do not prevent balls 20 and 22 from reseating at the same place in sockets 19 and 23 from which they had been unseated. Non-vertical forces arise as a consequence of the fact that deflection of said levers involves displacement in the horizontal as well as the vertical direction. Accordingly, since the rod 21 is not absolutely rigid, the first ball reseating contact may occur with the rod 21 slightly curved and the balls contacting the sockets along circles of contact (of the balls), that are different than those obtaining prior to the overrange. Accordingly, if the coefficient of friction between balls and sockets is sufficiently large, the new contact upon reseating may persist, with the result that the position of element 34 for a given feedback force will differ from that it previously took for the same given feedback force.

As remarked before, rotation of shaft 27 displaces nut 31 therealong. This has the effect of varying the configuration of the mechanism, in particular, the effective lever arm of lever 33 and of shaft 27, which latter, of course, is in effect an extension of lever 24.

The purpose of these changing lever arms is to vary the amount of feedback force necessary to balance a given change in input force. Thus, for a maximum range of difference in the pressures applied to device D, the ratio of feedback force to input force should be minimum, whereas for a minimum range of differences in said pressures, said ratio should be maximum.

As shown in FIGURES 2 and 3, the tabs 25 and 26 provide a simple, precise and stable mode of assuring that the rotatability of shaft 27 is provided without introducing an objectionable amount of play into the mechanism. Actually, under some circumstance play is permitted, but by a treatment analogous to that adopted with balls 20 and 22, and with sockets 19 and 23, said play is not permitted to alter the position of shaft 27 with respect to lever 24, on which it is mounted.

In FIGURE 2, shaft 27 is shown as having a cylindrical portion 27a at the end of the shaft having knob 32 thereon. The main body of the shaft, which has the threads 30 thereon, is a cylindrical member 27b of somewhat lesser diameter than portion 27a. The other end of shaft 27 has a cylindrical stub 27c thereon of somewhat lesser diameter than member 27b. Socket 23 is offset in position so that shaft 27 and rod 21 do not interfere with each other, when ball 22 is positioned as shown in FIGURE 1. The offset is required because lever 24 of FIGURES 2 et al., is intended to be used in a position inverted with respect to that shown for it in FIGURE 1.

Fulcrum nut 31 is shown as having a knife edge 31a projecting therefrom to provide substantially a line contact on lever 33. Also projecting from nut 31 is a guide 31b having a hole 31c therein. A straight guide rod 43 passes through hole 31c, terminating at a plate 44 to which the end of rod 43 is fixed by any suitable means (not shown). A second guide rod 43 is similarly fixed to plate 44, and both rods 43 run parallel to shaft 27 back to tab 26 to which they may be fixed, or, as shown, continue on to tab 25 to which rods 43 are fixed by any suitable means (not shown), the rods, of course, then passing through suitable holes (not shown) in tab 26. Plate 44 has a window 44a therein which receives stub 27c. As will be seen, shaft 27 is supported independently of plate 44, and this last, along with rods 43, provides a more or less rigid frame having the purpose of preventing rotation of fulcrum nut 30 while allowing it to move along member 27b when knob 32 is turned and shaft 27 rotates in place about its axis, which as shown as colinear with the cylindrical axis of portion 27a and member 27b.

As shown in FIGURE 4, tab 25 provides a V-notch 45 formed by the flat surfaces 50 oriented such that they are normal to the same plane, preferably a plane normal to the axis of rotation of shaft 27, and at an angle to each other. Tab 26 provides a notch 46 formed by flat surfaces 51 lying normal to said plane and at an angle to each other. V-notch 46 is most conveniently formed as one side of a hole through tab 26, the rest of said hole being shown in broken line at 47.

A circular V-groove 48 is provided in portion 27a of shaft 27. The groove 48 is defined by a pair of frustoconical surfaces 52, each coaxial with the axis of rotation of shaft 27, and merging together at their small ends.

Conveniently, groove 48 is formed by machining the surfaces 52 into the portion 27a to sufficient radial depth that they merge at an intermediate cylindrical region 49 of axial extent of less than the thickness of tab 25, which is of uniform thickness so that the surfaces 50 are rectangular elements, the long sides of which are tangent to surfaces 52 at points on the sloping surfaces 52 intermediate the respective frustal bases of the frusto-conical forms providing surfaces 52. This relationship is plainly evident from FIGURE 7 which differs from the other figures by being highly magnified in proportions in comparison to said other figures.

Notches 45 and 46 are so dimensioned and the surfaces 50 and 51 are so oriented that if lever 24 is fixed in position and the knob 32 is pushed such as to deflect shaft 27 in a plane normal to the plane of FIGURE 2, and such that from the point of view of FIGURE 3, a clockwise deflection of the knob end of shaft 27 occurs, surfaces 52 will be forced against the long edges of surfaces 50 of notch 45, and member 27b will be forced into contact with the surfaces 51 of notch 46, with the surfaces 50 substantially parallel to the common axis of the frusto-conical forms providing surfaces 52, and therefore substantially parallel to the axis of rotation of shaft 27. If, then, knob 32 is rotated, the points on surfaces 52 which successively pass in and out of tangency with the edges of surfaces 50, will lie in circles centered on said axis of rotation and lying in planes normal to said axis of rotation.

In the organization shown in FIGURE 1, the foregoing is what occurs, for spring 6 creates a force pulling down on lever 24 by means of lever 12, rod 21 and ball 22. Play between notches 45 and 46, on the one hand, and shaft 27, on the other hand, therefore is taken up by the seating of the shaft in the notches as described supra, the force pulling down on lever 24 being opposed by the various spring elements such as cross strip fulcrums 16, 28 and 36. When the organization is in operation, the difference in pressures applied to the device and the force due to voice coil 39 balance each other out, so that normally shaft 27 remains immobilized in notches 45 and 46, effectively being an integral part of lever 24.

Furthermore, though shaft 27 can be rotated in place to displace nut 31 therealong, or though the system of forces acting on the beam may change such as to lift ball 22 up out of socket 23, either no change in the seating of shaft 27 in notches 45 and 46 changes, or if such change does occur, return of the system of forces to its original state reseats shaft 27 in notches 45 and 46 substantially precisely in the same configuration as prior to the last said change.

The degree to which the last said configuration is restored depends on the angles of the V-notches, the angle of the V-groove 48, and the diameter of the shaft 27 at notch 46. That is, if the torque tending to seat shaft 27 in notches 45 and 46 creates a component of force parallel to either of surfaces 51, that is greater than the component (also created by said torque) normal to such surface and multiplied by the coefficient of friction between the shaft 27 and such surface, then member 27 will always slide to the bottom of notch 46.

The same situation obtains as between notch 45 and groove 48, except that here the seating situation is double, i.e., there is a seating with respect to notch 45 and a seating with respect to groove 48.

Having reference to FIGURE 1, it will be observed that notches 45 and 46 neutralize counterclockwise force couples in the plane of deflection of lever 24, which plane is fixed by the deflection axis of lever 28, said deflection axis being normal to the plane of FIGURE 1, and groove 48 prevents horizontal motion of shaft 27 in the plane of FIGURE 1. Moreover, if it nevertheless happens that shaft 27 unseats from either or both notches, or any surface of either notch, the shaft nevertheless always returns to its original seating position.

As thus far described, the notch and groove seating arrangement for shaft 27 provide, in practice, a rotary bearing for shaft 27 that has almost literally zero play; in comparison, the play of nut 31 on threaded portion 30 is large, even though nut 31 and threaded portion 30 in practice are constructed to provide what is conventionally considered negligible play. The materials used in constructing lever 24 and shaft 27, at least at the places they are in contact, are normally chosen to be sufficiently hard as not to wear readily. As long as wear does not appreciably affect the geometry of the points of contact, the lever and shaft may be assembled and disassembled or seated and unseated, at will, yet will always reseat in the same position. Surface finish of the places of contact, while subject to the need for reseating by the forces in the mechanism, is otherwise open to wide latitude in smoothness. In practice, we supplement the seating forces on shaft 27 by locating plate 44 such that the side 44b of the window 44a therein presses downward on stub 27c, as by orienting the lengths of rods 43 so that in their unstressed form, they would hold the plate in a position where the side 44b lies in the space occupied by stub 27c, so that when shaft 27 is in place and seated, stub 27c forces plate 44 down (up out of the paper, from the point of view of FIGURE 2), against the cantilever spring-like resistance of rods 43, which are therefore deflected slightly. This provides an initial seating force on shaft 27, independent of all other forces, even though shaft 27 and lever 24, assembled together, are removed from the rest of the mechanism.

It is also evident that our invention is useful in the general class of mechanism having a bar linkage system which normally depends on elastic forces in order to maintain a desired configuration, yet may in effect release parts of the linkage under certain conditions and nevertheless return precisely to the said desired configuration when conditions warrant.

In FIGURE 1, box E represents the electronic circuitry involved in converting the position of detector element 34 into DC current in voice coil 39. Detector 35, circuitry E and voice coil 39 may take the form illustrated in the copending application for U.S. Letters Patent of R. W. Barthel, S.N. 411,875, filed Nov. 17, 1964 and now U.S. Letters Patent No. 3,376,482, granted Apr. 2, 1968, entitled Rebalancing System Using Multiple Force Range Motor And Power Source, and assigned to the assignee of the present invention. It is to be noted that the prior art knows many and different expendients for converting slight motions of a mechanism into a force that is fed back to the system to oppose said motions. Our invention, as claimed herein, is also applicable to force balance mechanisms using such prior art expendients, whether they be electrical, pneumatic, hydraulic or otherwise, in nature. It is obvious, moreover, that the original source of motions may be other than the pressure responsive device D, without departing from the invention claimed herein. By way of example, however, device D may be as described in the copending application for U.S. Letters Patent of K. L. Tate et al., S.N. 201,627, filed June 11, 1962, entitled, Pressure Responsive Device, and assigned to the assignee of the present invention, and now U.S. Letters Patent No. 3,170,380, granted Feb. 23, 1965.

Various modifications and rearrangements of our invention are possible without departing from the spirit of the invention. For example, it is evident that the rounded stop 15, against which spring arm 14 pushes could equally well be a ball suspended from a rigid arm (like arm 13, but lying above the spring 14) and being socketed in a further pad (like pad 18) mounted on spring arm 14. That is to say, the connection between the rigid part of lever 12 and the free end of spring arm 14 could be made by means of a ball link and socket arrangement like that provided between the free end of spring arm 14 and lever 24.

In the foregoing, the action of the mechanism has been explained in terms of both "motion" and "forces." As is usual in force-balance instruments of this sort, the practical ideal is to prevent friction, hysteresis, etc., from affecting the configuration of the mechanism, so that insofar as possible, deviation from the configuration is proportional solely to the magnitude of the pressure difference, or the like, providing the force is exerted by lever 7. The force balance property assures that such deviation is slight and, typically, the deviations involved are measured in thousandths of an inch, except on overranging of course. Short of overrange, spring arm 14 of lever 12, is in effect a rigid beam, whether its deflection be clockwise or counterclockwise, and only overranging suffices to flex it off to stop 15. Rod 21, on the other hand, bends slightly as lever 24 deflects, thus obviating need for rotation of its balls and introduction of a frictional effect in the course of accommodating to change in the angle between lever 24 and rod 21. The edge of knifeedge 31a is a circular arc whose radius originates at the center of rotation of shaft 27, so that rotary play of nut 31 does not change the distance between beam 33 and shaft 27. In such ways as these, a very precise and repeatable relation between the configuration of the mechanism and the differential pressure is maintained.

The term "mechanism" herein is used in the kinematic sense, as referring to four-bar linkage systems or assemblages thereof. For example, lever 24, lever 12 and rod 21 form a four-bar linkage (objects 17 and 29 provide the fourth or fixed bar of such linkage).

We do not intend that the scope of our invention be limited by the detailed description herein, but intend rather that the claims appended hereto be looked to in order to set the scope of our invention.

Having described the invention as required by the statutes, we claim:

1. A mechanism comprising a rotatable shaft, a first lever, a second lever, and a link, said link comprising an inextensible, elastic rod each end of which terminates in a ball; said levers each having a conical socket therein, such sockets having their axes normally substantially aligned, each of said sockets defining a hole through its associated lever, and said sockets being oriented so that said sockets open away from each other; said rod passing through each said hole and each said ball being received in one of said sockets, each said lever being mounted for deflection about a given axis; said first lever having thereon a mounting means for said shaft, said mounting means comprising a pair of V-notch fulcra disposed on opposite sides of said shaft, said shaft having circular cross-sections engaging each such V-notch, one of said cross-sections being in the form of a circular V-groove extending around said shaft, with the sides of the V-notch of the associated fulcrum engaging the sides of said V-groove, the last said V-notch being formed in a tab of sufficient thickness that the bottom of the last said V-groove is spaced from the said last said V-notch; said mechanism including force-exerting means acting elastically on said shaft and on said levers such as to seat said balls in said sockets and said shaft in said V-notches.

2. The invention of claim 1, wherein the axes of said levers are in substantially parallel planes, and said V-notches are substantially bisected by a common plane substantially normal to said axes.

3. The invention of claim 1, wherein said shaft is constructed and arranged such that upon rotation of said shaft the force thereon due to said force-exerting means varies as a function of the amount of such rotation.

4. The invenion of claim 1, wherein said force-exerting means includes a negative feedback force-exerting device, and a condition responsive device; and there being also provided means for detecting motion of a part of said mechanism due to said devices; and means responsive to the last said means to vary the force exerted by said negative feedback force-exerting device in a sense such as to create motion of said part counter to motion thereof due to said condition responsive device.

5. The invention of claim 4, wherein said shaft is means constructed and arranged such that upon rotation of said shaft the force exerted by said negative feedback force-exerting device in response to motion of said part is a function of the amount of said rotation.

6. Mechanism comprising a pair of levers and a link, said link being interconnected between the ends of said levers and comprising an inextensible elastic rod, one end of which terminates in a ball, one of said levers having a conical socket therein, said socket having its axis normally substantially aligned with the length of said link, said socket defining a hole through its associated lever and being oriented so that it opens away from the other of said levers; said rod passing through said hole and said ball being received in said socket; and each said lever being mounted for deflection about a given axis, there being force-exerting means acting elastically on said levers such as to seat said ball in said socket.

7. The invention of claim 6, wherein said force-exerting means includes a negative feedback force-exerting device and a condition responsive device; there also being provided means for detecting motion of a part of said mechanism due to said devices, and including means responsive to the last said means to vary the force exerted by said negative feedback force-exerting device in a sense such as to create motion of said part counter to motion thereof due to said condition responsive device.

8. Mechanism comprising a pair of levers and a link, said link comprising an inextensible elastic rod each end of which terminates in a ball, said levers each having a conical socket therein, said sockets having their axes normally substantially aligned, each said socket defining a hole through its associated lever and said sockets being oriented so that said sockets open away from each other; said rod passing through each said hole and each said ball being received in one of said sockets; each of said lever being mounted for deflection about a given axis, there being force-exerting means acting elastically on said levers such as to seat said balls in said sockets.

9. The invention of claim 8, wherein said force-exerting means includes a negative feedback force-exerting device, and a condition responsive device; there also being provided means for detecting motion of a part of said mechanism due to said devices; and including means responsive to the last said means to vary the force exerted by said negative feedback force-exerting device in a sense such as to create motion of said part counter to motion thereof due to said condition responsive device.

10. In a mechanism having an elastic link coupling relatively-movable parts thereof, said parts being subject to elastic forces tensioning said link, one of said parts being a lever mounted for deflection about a given axis, said lever having a conical socket therein, said link having a ball fixed to one end thereof, and said link passing through said lever to the other said parts and being secured thereto, said socket being oriented so that forces urge said ball to the small end of said socket, with the axis of said socket being substantially colinear with the line of action defined by said link, the coefficient of friction between said ball and socket being such and the cone angle of said socket being such that if said one of said parts is moved from the position defined above and thereafter allowed to return toward said position under the elastic forces that had originally obtained when said one of said parts was first in said position, said one of said parts will attain said position with the said ball seated in said socket.

11. Mechanism comprising a rotatable shaft and a lever, said lever and said shaft being mounted for deflection about axes transverse to the lengths of said lever and said shaft and having thereon a mounting means for said shaft, said mounting means comprising a pair of V-notch fulcra disposed on opposite sides of said shaft, said shaft having circular sections engaging each such V-notch, one of said cross-sections being in the form of a V-groove extending around said shaft, with the sides of the V-notch of the associated fulcrum engaging the sides of said V-groove, the last said V-notch being formed in a tab of sufficient thickness that the bottom of the last said V-groove is spaced from the bottom of the said last said V-notch; there being force exerting means acting on said lever and said shaft such as to seat said circular sections in said V-notches.

12. The invention of claim 11, wherein the said deflection axes of said lever and shaft are in substantially parallel planes and said V-notches are substantially bisected by a common plane substantially normal to said axes.

13. The invention of claim 11, wherein said shaft is so constructed and arranged that upon rotation of said shaft the force thereon due to said force-exerting means varies as a function of the amount of said rotation.

References Cited

UNITED STATES PATENTS

| | | | |
|---|---|---|---|
| 2,595,813 | 5/1962 | Raney | 74—469 |
| 3,013,437 | 12/1961 | Harding | 74—469 |
| 3,250,144 | 5/1966 | Kanaman | 74—470 |
| 2,956,212 | 10/1960 | Olsen | 340—187 |
| 3,011,348 | 12/1961 | Roper | 340—187 |
| 3,100,858 | 8/1963 | Topazio | 340—187 |

THOMAS B. HABECKER, *Primary Examiner.*